United States Patent [19]

Psyras et al.

[11] 3,745,747
[45] July 17, 1973

[54] GAS PURIFICATION SYSTEM

[75] Inventors: Hippocrates G. Psyras, Berkeley Heights, N.J.; Arther Angelo Bellisio, Huntington Station, N.Y.

[73] Assignee: GAF Corporation, New York, N.Y.

[22] Filed: Mar. 25, 1971

[21] Appl. No.: 128,075

[52] U.S. Cl. .................................................. 55/31
[51] Int. Cl. ........................................... B01d 53/14
[58] Field of Search .......... 55/29–32, 68, 73, 48, 51

[56] References Cited
UNITED STATES PATENTS

| | | | |
|---|---|---|---|
| 3,492,788 | 2/1970 | Hochgosand et al. | 55/48 |
| 3,589,104 | 6/1971 | Panzarella | 55/32 |
| 2,225,959 | 12/1940 | Miller | 55/30 |
| 3,321,890 | 5/1967 | Barnhart | 55/32 |

Primary Examiner—Charles N. Hart
Attorney—Walter C. Kehm and Samson B. Leavitt

[57] ABSTRACT

A method as disclosed for the recovery of N-alkylated lactams and particularly N-methyl pyrrolidone which may become entrained in gas streams treated with such materials. The lactams are useful, specific, absorbing solvents used in the sweetening and dehydrating of natural gases and also for the selective solvation of various components or impurities from mixed gas streams. During such treatments, the lactams become vaporized or entrained in the gas streams. In the process of this invention, the entrained N-alkyllactam is selectively recovered by the treatment of the gas stream with liquid solvents for the N-alkyllactam. Among suitable solvents for the recovery of the usually used lactams, including methyl pyrrolidone, are the tri- and tetra ethylene glycols and the higher boiling N-alkyl pyrrolidones including N-cyclohexyl pryyolidone.

20 Claims, 2 Drawing Figures

GAS PURIFICATION SYSTEM

RELATED APPLICATIONS

This application is related to U.S. Pat. application Ser. No. 127,943 concurrently filed which describes a process for the dehydration of gas.

FIELD OF THE INVENTION

The present invention relates to solvent recovery methods and more particularly to methods for the recovery of certain N-alkylated lactams including N-methyl pyrrolidone.

BACKGROUND OF THE INVENTION

The N-alkyllactams are a particularly useful group of industrial solvents having a wide spectrum of solvent capabilities. These capabilities have engendered their widespread use for the treatment of gas mixtures. The N-alkyllactams have been disclosed useful in sweetening operations for natural and manufactured fuel gases. The most useful of these lactams for such sweetening operations is N-methyl pyrrolidone. Processes utilizing N-methyl pyrrolidone for the sweetening of natural gas have been described in U.S. Pat. Nos. 3,120,993 and 3,324,627 which show the removal of acidic components or impurities from fuel gases. Hydrogen sulfide, carbon dioxide and carbonyl sulfide are the components removed. The N-methyl pyrrolidone is contacted with the flowing gas either in a column or by spray injection into the gas stream and the acidic impurities are absorbed and dissolved by the liquid N-methyl pyrrolidone. However, during the absorption operations, certain small amounts of N-methyl pyrrolidone do become vaporized or entrained in the stream of the purified gases. This vaporization also occurs in the course of other processes where the N-alkyllactams are contacted with flowing gases such as the scrubbing of stack gases as disclosed in U.S. Pat. application, Ser. No. 872,775 and the dehydration of gases as disclosed in U.S. Pat. application Ser. No. 127,943 filed concurrently by us.

The N-alkyllactams and more particularly N-methyl pyrrolidone are used in many other gas processes wherein the N-methyl pyrrolidone or similar lactams may become entrained in the treated gases. The entrained material is usually in the form of the vapors of the lactam but finely divided liquid particles of the lactam are also entrained. In order to render such processes more economical, it is an object of the present invention to provide a novel recovery method utilizing solvents for the selective absorption of the entrained N-alkylated lactams from such gases and to recover same.

STATEMENT OF THE INVENTION

The present invention provides a method for the recovery of N-alkylated lactams entrained by gas streams comprising contacting of the gas streams with a solvent for the N-alkylated lactams in liquid form. The liquid solvent should have a boiling point higher than that of the lactam being recovered and a solubility for said lactam. After the intimate contacting of the gas stream containing the entrained lactam with the liquid solvent, the liquid solvent abstracts and dissolves substantially all the entrained lactam from the gas stream. The solvent containing the dissolved lactam is collected and removed from the gas stream. The N-alkylated lactam is then separated from the liquid solvent; and the lactam and the solvent are each recovered and recycled for their specific purposes.

The liquid N-alkyllactams utilized and recovered in accordance with the process of the present invention are lactams of the $\alpha$- and $\gamma$-amino acids derived from butyric acid, valeric acid and caprylic acid. Such substances are cyclic acid amides. They are neutral solvents and act as physically dissolving absorbents for water, certain of the acidic components of natural gases including $H_2S$ and carbonyl sulfide and aromatic compounds. Generally, the lower alkyl groups in the ranges from one to about seven carbon atoms, including the cycloalkyls such as N-cyclohexyl are preferred over the longer carbon-chain alkyl groups as N-alkyl substituents on the lactams. Among the desirable N-alkyllactams this invention is designed to recover are, N-methyl pyrrolidone, N-propyl pyrrolidone, N-isopropyl pyrrolidone, N-p-butyl pyrrolidone, N-n-butyl pyrrolidone, N-n-hexyl pyrrolidone, N-cyclohexyl pyrrolidone, N-methyl piperidone, N-ethyl piperidone, N-propyl piperidone and N-isopropyl piperidone.

The more generally used N-alkylated lactams in such industrial processes as sweetening, dehydration and for $SO_2$ removal, is N-methyl pyrrolidone. N-methyl pyrrolidone is by far the more commonly used because of its greater solution capability for sulfur-containing compounds, its economy and its greater availability.

It has been calculated, for ambient temperatures, that in previous processes, when N-methyl pyrrolidone is used as the selective treating agent for the sweetening of natural gas, and when no solvent recovery process is used, that approximately 80 to 100 lbs. of N-methyl pyrrolidone is entrained and lost into an 800 psig/77°F. natural gas stream per 100 million standard cubic feet (100 MMscf) of gas treated. When N-methyl pyrrolidone is used for the dehydration of natural gas streams at the well head, a similar loss of entrained N-methyl pyrrolidone is used.

When the N-methyl pyrrolidone is used for the removal of sulfur dioxide from stack gases and from Klaus furnace gases, the absorption stage usually is at temperatures up to 60°C. At such temperatures, it has been noted that the loss of N-methyl pyrrolidone amounts to about 60 lbs. per million pounds of treated gases even with more than 99 percent solvent recovery. It should be noted that almost two tons of sulfur is recovered per hour at larger treatment plants.

In accordance with the process of the present invention, the selective solvent for the N-lower alkyl lactams is a solvent having a boiling point at least 25°C. but preferably more than 50°C. higher than that of the N-alkylated lactam being recovered. Preferred solvents include tri- and tetraethylene glycol and N-higher alkyl pyrrolidones such as N-cyclohexyl pyrrolidone. Other suitable solvents meeting the criteria set forth above for the efficient recovery of the industrially useful N-lower alkyllactams are:
Nitrobenzene
Diethylene glycol
Monoethers of diethyleneglycol
Diethers of diethylene glycol
Dibutyl phthalate
Trichlorobenzene
Butyl carbitols
2-phenoxyethanol
Triethanolamine Napthalene
Acetamide
Indole
Quinoline
Mineral oil
Glycerine
1,2,3,4,tetrahydro-2-naphthol
Liquid low molecular weight polyethylene glycols
Dimethyl ethers of polyethylene glycols
Dialkylethers glycol and glycerol which are liquid at temperatures below about 200°C including the methyl and ethyl ethers of propylene and polypropylene glycols
Liquid propylene and polypropylene glycols
N-alkyl bis pyrrolidones
1-6 bis N-pyrrolidyl hexamethylene
N-n-octyl pyrrolidone
1-3 N-pyrollidyl butane
N-n-decyl pyrrolidone
N-undecyl pyrrolidone
N-dodecyl pyrrolidone
N-tetradecyl pyrrolidone
N-hexadecyl pyrrolidone
N-n-hexyl piperidone
N-n-octyl piperidone
N-isooctyl piperidone
N-n-decyl piperidone
N-n-undecyl piperidone
N-dedecyl piperidone
N-tetradecyl piperidone
N-hexadecyl piperidone It is of interest and value, at this point, to show in Table 1 the high-pressure equilibrium for various hydrocarbons and acid gas components in two particular pyrrolidones:

TABLE 1

Conditions: 800 PSIG 80°F.

| Gaseous Component | $K = y/x$ Values Anhydrous N-Methyl-2-Pyrrolidone | Anhydrous N-Cyclohexyl-2-Pyrrolidone |
|---|---|---|
| Methane | 18.0 | 7.2 |
| Ethane | 3.5 | 2.12 |
| Propane | 1.7 | 0.77 |
| Carbon Dioxide | 2.3 | 1.22 |
| Hydrogen Sulfide | 0.19 | 0.19 |

Notes:
$K = y/x$
$y$ = Mole Fraction in Vapor Phase
$x$ = Mole Fraction in Equilibrium Liquid Phase The term "solvent" is used broadly herein but in fact there may be either a physical solution of the lactam in the solvent or merely a physical mixture of two completely miscible substances. The need for such a broad term arises as the N-methyl pyrrolidone and other of the lighter lactams do not form azeotropic mixtures with many of the solvents useful in this invention and therefore their status as absorbants and/or solvents is a matter of semantics.

The method for the contacting of the gases containing the entrained N-alkyllactam with the solvent/absorbent for the N-alkyllactam can be any of those classically used for efficiently contacting gases and liquids including bubbling the gas stream through the liquid; spraying the liquid into the gas stream; using countercurrent contacting towers or columns, either conventionally packed, provided with plates, or having spray heads for the introduction of the solvent at the top of the unpacked towers. The preferred system is the countercurrent tower with the choice of packing or the number of trays determined by the viscosity of the solvent at the operating temperature and the volume of the gas stream.

The gas stream, after the entrained lactam vapors are removed, is vented or piped for further treatment or for transportation, in the case of fuel gases. Stack gases, may of course, be vented since the offending $SO_2$ as well as the unburned heavy hydrocarbons, have been removed by the primary treatment with the N-alkyllactam preferably N-methyl pyrrolidone. It is to be noted that N-methyl pyrrolidone is an efficient solvent for both the unburned hydrocarbons and the $SO_2$.

The initial liquid N-alkyllactam which was used for the primary absorption treatment of the gas stream such as for sweetening, $SO_2$ absorption, or for dehydration, is collected at the bottom of the primary absorption apparatus or column and the absorbed material is removed from the lactam. Heating the solution will removed dissolved $H_2S$ and $SO_2$ from the N-alkyllactam. Distillation or evaporation at normal or reduced pressures is required for the removal of absorbed water. Heavier hydrocarbons, that are absorbed, are removed from the lactam either by distillation or are "salted out" by adding saturated solutions of aqueous electrolytes. The hydrocarbons may be recovered and provide a convenient source of fuel for the distillation operations.

The solution from the secondary absorption solvent for the lactam and the entrained lactam dissolved therein, is collected in a conventional manner at the bottom of the tower on bubble trays or in liquid traps along the piped gas stream. It is led from these collection areas to separation equipment where the absorbed and dissolved lactam is separated from its solvent/absorbant.

The collected solvent containing the lactam, is then reconcentrated preferably by distillation and the N-alkyllactam is removed. The distillation may take place at ambient pressures or at reduced pressures. For ease of the separation, the solvent should have a boiling point at room temperature at least 25°C. above that of the entrained lactam but closer boiling solvents may be used if, when the distillation is conducted at reduced pressures, the vapor pressures of the solvents are low at the temperature at which the N-alkyllactam distills. Special rectifying stills are, of course, necessary to separate such closely boiling components.

Both the distilled lactam and the reconcentrated solvents may then be reintroduced into the main process to resume their original functions.

With regard to the solvent, it is preferred that it be introduced into the gas stream for the absorption of the lactam in substantially anhydrous form as this sometimes increases its capacity to absorb or dissolve the lactam and greatly reduces the distillation difficulties in regenerating and recovering both the solvent and lactam. However, up to 3 percent by weight of water in the solvent may be tolerated provided that it does not too severely reduce the capacity of the solvent to absorb the entrained lactam. The polyethylene glycols and the N-higher alkyl lactams as absorbants can be used with even greater water content. It is, however, preferred to minimize the water content of the solvent for economic reasons especially where the primary gas treatment is a dehydration treatment.

Generally, it has been found that the amount of solvent used to absorb the entrained lactam is dependent upon the viscosity of the solvent, the tower packing and the rate of gas flow. Solvent rates for recovering vaporized and entrained lactams vary from at least 1 to 10 percent of the lactam flow rate, depending upon temperature, pressure, and liquid viscosity during natural gas dehydration operations.

The process of this invention will be more particularly described and its advantages made apparent by reference to the drawing of which.

Figure 1:
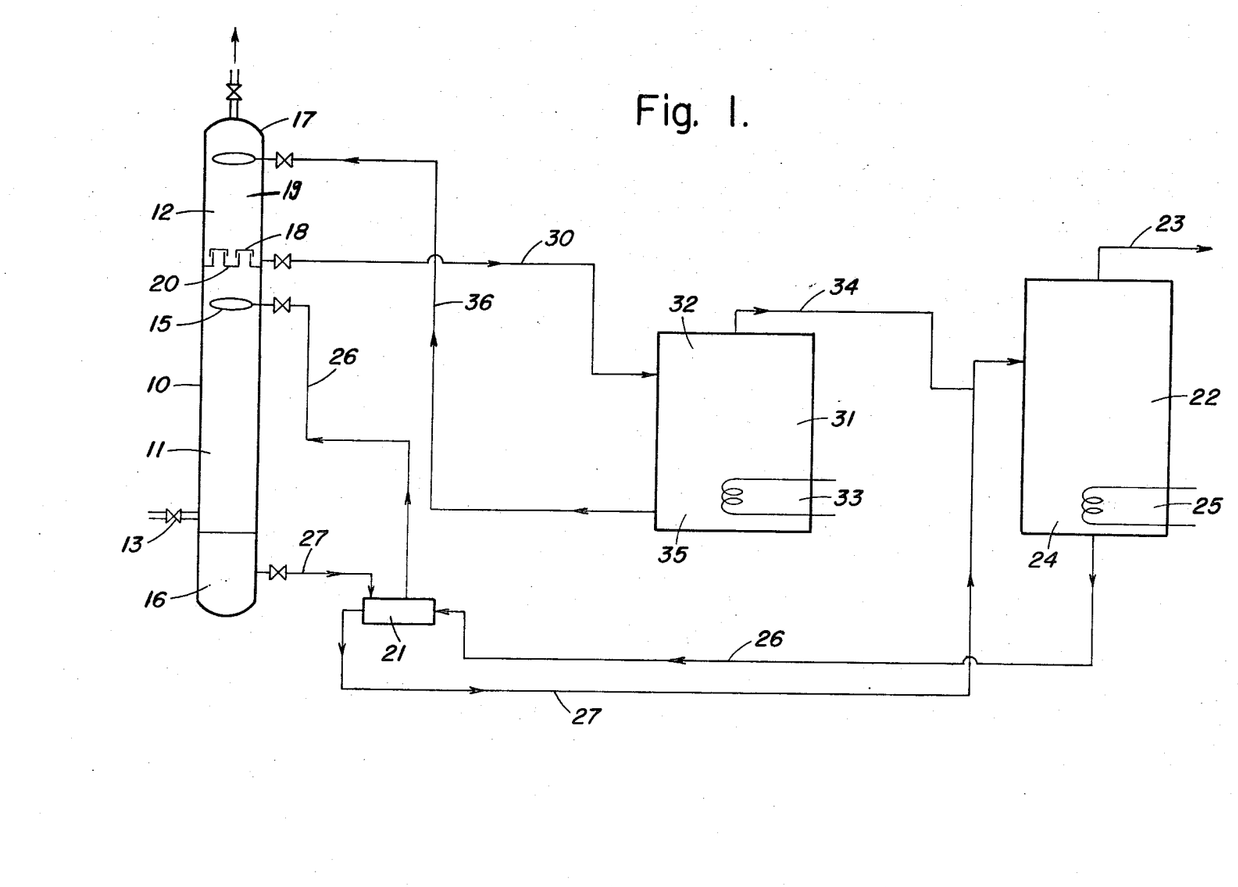
FIG. 1 shows a schematic flow-diagram of a plant wherein the N-lower alkyllactam is utilized as the primary material for treating the gas stream and where any entrained lactam is then recovered from the gas stream by the solvent for the lactam in a separate recovery stage.

Referring specifically to FIG. 1, the gas stream is treated with the lactam in a double-section absorber column 10 within which the contacting of the gas stream and the lactam takes place in a primary absorption section 11. The gas stream is led into this primary absorption section 11 via gas stream entry portal 13. In the primary absorption section 11, the lactam is introduced via lactam sprays 15 and after complete and intimate countercurrent contacting of the rising gas stream with the lactam flowing downwardly, the lactam is collected at the bottom of the primary absorption section 11 in the lactam collection section 16. The primary absorption section 11 may consist of either a packed column or a series of bubble trays to insure complete and intimate contacting of the gas stream with the lactam. The choice of contacting media or method is dependent upon the viscosity of the lactam, the rate of the gas flow and the particular material to be absorbed by the lactam.

In the course of the contacting of the lactam by the gas stream, a small amount of the lactam is entrained in the gas stream leaving the primary absorbing section 11 through bubble plate 20. The gas stream from bubble plate 20 enters into the secondary absorption section 12 of absorber column 10 where gas stream containing the entrained lactam is intimately contacted with the solvent which is introduced into the secondary absorber section 19 via solvent spray 17. The secondary absorption section 12 also may be either a packed tower or consist of the conventional trays or packing media normally utilized for intimately contacting liquids with gases. The solvent introduced at spray section 17 after proceeding in a countercurrent fashion through the gas stream containing the entrained lactam, absorbs and removes substantially all of the lactam entrained from the gas stream and the solvent collects at the bottom of the secondary absorption section 12 in solvent absorbate collection section 18 above bubble plate 20. The gas stream, for which all of the entrained lactam has been removed, leaves the absorber column 10 via gas stream exit portal 14 for either venting, further treatment or transportation via pipeline.

The lactam, containing the material absorbed from the gas stream collects at the bottom of the primary absorption section 11 in lactam collection section 16, is then led via lactam piping line 27 to a power recovery unit and heat exchanger 21 for pressure reduction and heating, if necessary, and from there to the lactam regenerator 22. Lactam regenerator 22 may be either a flash chamber, a still or similar apparatus wherein the impurities absorbed by the lactam are freed therefrom by either simple heating operation in the case of absorbed gases such as $H_2S$ or $SO_2$ or by more sophisticated distillation operations when the components are heavy hydrocarbons or water. The lactam introduced into the lactam regenerator 22 is heated, by heat source 25, and impurities which are flashed or distilled are led from the lactam regenerator 22 via impurity exit portal 23. The purified lactam is then collected in the purified lactam collection sump 24 from where it is led via lactam injection line 26 through the power recovery unit and heat exchanger 21 to the lactam spray section 15 at the top of the primary absorption section 11 of the absorber column 10. At the power recovery unit and heat exchanger unit 21, the lactam piping line 27 containing its absorbed impurities may be used to cool and/or repressurize the purified lactam in lactam injection line 26 on its way to the spray section 15.

The solvent with absorbed lactam, which accumulates at solvent collection section 18, is led via solvent absorbate line 30 to solvent reconcentrator 31 where the solvent absorbate is heated by heater 33 to distill the lactam which is condensed and is collected in lactam condensate section 32 from where it is led via lactam overhead line 34 which joins lactam piping line 27 near the intake of the lactam regenerator 22 whereby this lactam portion is also purified. The solvent, after removal of the lactam in the solvent reconcentrator 31 is collected at the lower portions in the reconcentrator at solvent sump 35 from where it is led via pipeline 36 to the solvent spray section 17 and reintroduced into solvent contacting section 19 of absorber tower 10.

Figure 2:
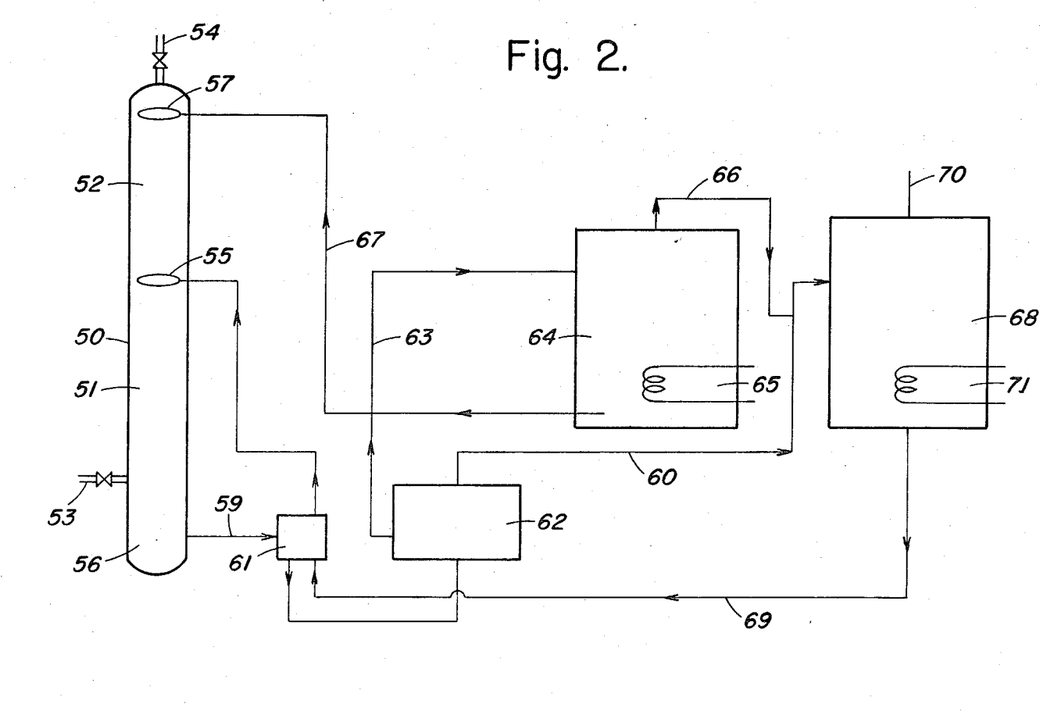
FIG. 2 shows a schematic flow-diagram of a similar plant, according to this invention, wherein the recovery solvent, after its absorption of the entrained lactam from the gas stream, is permitted to mix with the primary accumulation of the lactam and a single collection system is used for both the lactam and its solvent. These are then regenerated and recycled after removal of the initial impurities from the lactam.

With regard to FIG. 2, the process therein is simplified from that of FIG. 1, in that the solvent for the entrained lactam is collected together with the lactam used for the primary purification of the gas stream. It is separated from the lactam only in amounts sufficient for recapturing the entrained lactam. This reduces the amount of piping. This can be done since the solvent for the lactam is completely miscible and compatible with the lactam.

As illustrated in FIG. 2, the gas stream is initially extracted with the lactam in absorption column 50 in a primary absorption section 51. Within this primary absorption section 51, the gas stream, introduced at the lower end via entry portal 53, flows countercurrent to the lactam which is introduced preferably by sprayers 55 at the upper portion of the primary absorption section 51. The primary absorption section 51 may have any of the commonly used devices for effectively contacting liquids with gases including tower packings and bubble trays (not shown). The gas stream will be completely and effectively extracted of the desired components by the absorption capacity of the lactam which then collects at the bottom of column 50 in collection section 56. The gas continues flowing in its upward direction and passes from the primary absorption section to the secondary absorption section for contact with the lactam solvent. The solvent is introduced into column 50 at the top end of the secondary absorption section 52 via solvent spray 57 and flows in countercurrent relationship to the gas stream. There any lactam entrained in the gas stream in the course of its passage through primary absorption section 51 is extracted by the downwardly flowing solvent for the lactam as provided by this invention. The solvent, containing the absorbed lactam, continues its downward flow countercurrent to the gas stream through the primary absorption section 51 and finally accumulates in the collection section 56 where it mixes with the previously collected lactam. The gas stream, introduced at entry portal 53, after flowing from the bottom of column 50 and having been extracted of its initial impurities in absorption section 51 and having had any entrained lactams removed in extraction section 52 then leaves column 50 at its upper end via exit portal 54.

The mixture of the lactam, its absorbed impurities and the solvent collected in collection section 56, is led via line 59 through an optional power recovery and/or head exchanger and from there, the mixture is led to a holding tank 62. A portion of this mixture is led via line 63 to the solvent reconcentrator 64. In the solvent reconcentrator 64, the heat from heat source 65 is applied in order to distill from the higher boiling solvent the lower boiling lactam and the impurities which the lactam had absorbed. The mixture of lactam and its impurities in liquid or vapor form is then led via distillation line 66 to the regenerator 68. The remaining solvent in the solvent reconcentrator 64, freed from its lower boiling absorbates, is then led via line 67 back to the solvent spray 57 at the head of the absorption column 50.

An additional line 60 leads from holding tank 62 to regenerator 68 and through which the remaining portion of the solvent and lactam is pumped. In the regenerator 68, heated by heat source 71 to a temperature at which the solvent/lactam mixture is stripped of substantially all of the lower boiling absorbed impurities absorbed by the lactams such as $H_2S$, $CO_2$, COS, $SO_2$, aromatic and "heavy" hydrocarbons and water. The purified solvent/lactam mixture is then led via line 69 to sprayer 55 at the top of the primary absorption section 51 of absorption column 50. The vaporized impurities are removed from the system via line 70.

The small amount of solvent in the lactam does not interfere with the absorption capacity of the lactam beyond its relative volume in the mixture. Further, certain of the solvents have an inherent capacity to absorb the same impurities as the lactam and therefore do not affect substantially the volumetric efficiency of the mixture to absorb these impurities.

The term impurities as used in this description merely describes those materials in the gas stream which are subject to the primary absorption by the lactam. The term, as used, carries no implication other than that such materials are to be removed from the gas stream by absorption via the lactam.

The invention will be specifically described in the following examples detailing the use of this invention in certain processes. In the examples, the primary lactam utilized in the specific process of the examples is N-methyl pyrrolidone, the preferred lactam based upon absorption capability, efficiency and economy. The invention is, however, not restricted to the use and recovery of N-methyl pyrrolidone but rather to the recovery of this and any equivalent lactams for these processes.

Similarly, while the absorbent solvents for the entrained N-methyl pyrrolidone are exemplified by triethylene glycol, tetraethylene glycol and N-cyclohexyl pyrrolidone, any of the equivalents for these solvents as taught herein above may be utilized in place of these exemplified solvents.

EXAMPLE 1

NATURAL GAS DEHYDRATION

In a wellhead plant for dehydration of natural gas utilizing the process scheme shown in FIG. 1, natural gas at 800 psig. at 70° – 80°F (approximate average wellhead conditions) was introduced into column 10 via portal 13. The designed flow-rate capacity of the plant was 4 to 6 MMscf/day of natural gas with water saturation varying from 75 – 100 percent depending on the well. At 80°F. and 800 psig. saturated natural gas contains about 40 pounds of water vapor/MMscf.

Primary absorption section 11 of column 10 was fitted with eight bubble trays and the N-methyl pyrrolidone was introduced from sprayer 15 onto the uppermost tray at a rate of 23 gallons/MMscf. The N-methyl pyrrolidone flowed from the upper portions of primary absorption section 11 to successively lower trays and absorbed the water vapor from the natural gas and the N-methyl pyrrolidone/water mixture accumulated in collection section 16 at the bottom of primary absorption section 11.

The natural gas having passed through the trays to primary absorption section 11 and before entering secondary absorption section 12 via bubble tray 18, tested to a dewpoint of about 0° ± 5°. A loss of approximately 4–6 pounds of N-methyl pyrrolidone/MMscf flowing through primary absorption section 11 under these conditions was noted. Some N-methyl pyrrolidone, despite its rather low vapor pressure was vaporized and in addition, droplets of the N-methyl pyrrolidone were entrained within the gas stream.

The natural gas passed through bubble tray 18 and entered secondary absorption section 12 where it encountered the absorption solvent flowing downwardly from absorption solvent spray 17. The absorption solvent used was triethylene glycol (TEG) and was introduced into absorption section 12 at a rate of about 2.3 gallons/MMsef. The absorption section 12 was fitted with three bubble trays and the natural gas contacted and encountered the TEG flowing downwardly from bubble trays as it rose toward exit portal 14. The natural gas exiting via exit portal 14 tested to a dewpoint of about −10° to −20°F. or substantially well below the 7 lbs. of water/MMscf maximum set by the commercial pipelines. The TEG, upon contacting the natural gas, extracted the entrained N-methyl pyrrolidone and testing showed that the extraction is substantially completed. Less than one-fourth of 1 percent of the combined daily circulation of N-methyl pyrrolidone was lost in the overall system or less than 0.5 lbs./MMscf. The triethyleneglycol solvent containing the absorbed entrained N-methyl pyrrolidone after it completed its downward passage through secondary absorption section 12 accumulated at bubble tray 18. The N-methyl pyrrolidone which had accumulated in section 16 containing its absorbed water was led via pipeline 17 and heat-exchanger/pressure-reducer/power-abstractor 21 to regenerator 22 heated to about 300°–330°F. by heat source 25. In the regenerator 22, a still, the N-methyl pyrrolidone had its water distilled or flashed off at pressures of 5–8 psig. Some heavier hydrocarbon components of the natural gas also absorbed and were also distilled. These hydrocarbons are separated from the water in further equipment (not shown) and burned to provide a heat supply for heat source 25. The purified N-methyl pyrrolidone was led via line 26; through heat-exchanger/pressure-reducer/power-abstractor 21 where it was cooled and pressurized; and then to spray head 15 for reinjection at the upper portion of the primary absorption section 11 of column 10.

The triethylene glycol/N-methyl pyrrolidone mixture which accumulated below bubble cap 18 was led via line 30 to the TEG solvent reconcentrator 31 heated to 375°–400°F. by heater 33. The N-methyl pyrrolidone was vacuum distilled from the triethyleneglycol leaving as a vapor from section 32 from where it was led via line 34 through vapor pump (not shown) to a confluence with line 27 for introduction into the N-methyl pyrrolidone regenerator 22 where it was repurified along with the rest of the N-methyl pyrrolidone. The TEG was returned to spray head 17 via line 36.

EXAMPLE 2

NATURAL GAS DEHYDRATION

Utilizing the same apparatus and conditions described in Example 1 but substituting N-cyclohexyl pyrrolidone for the triethylene glycol of Example 1 yielded natural gas having a dewpoint of below −15°F. The feed rate of the N-cyclohexyl pyrrolidone was maintained at approximately the same rate as utilized for the triethylene glycol of Example 1. It was noted that not only was the N-methyl pyrrolidone recovered by the N-cyclohexyl pyrrolidone but that the N-cyclohexyl pyrrolidone due to its lower viscosity as compared to the triethylene glycol provided higher tray efficiency with less tray requirement in the upper section with resultant economies. It also appeared to pick up additional water. The small solvent reconcentrator was maintained at 375°–400°F. and a moderate vacuum around 20 inches of mercury.

EXAMPLE 3

NATURAL GAS DEHYDRATION

Gas from a wellhead under the conditions of Example 1, i.e., 800 psig, 80°F. and substantially saturated with water was fed into an apparatus according to FIG. 2. The natural gas was contacted with the N-methyl pyrrolidone introduced by spray 55 in primary absorption section 51 of column 50. The natural gas flowed upwardly from entry portal 53 and the N-methyl pyrrolidone flowed downwardly through primary absorption section 51 accumulating at the bottom in collection area 56. The natural gas after dehydration in primary absorption section 51 continued its upward flow in column 50 into secondary absorption section 52 where it was contacted by the downward flowing triethylene glycol introduced via spray head 57 at the upper portion of secondary absorption section 52. Here the N-methyl pyrrolidone entrained by the natural gas while traversing primary absorption section 51 was absorbed and removed from the gas stream and carried downward by the triethylene glycol through secondary absorption section 52 and primary absorption section 51 to accumulate at the bottom of the column in collection area 56 with the N-methyl pyrrolidone/water mixture. This mixture of N-methyl pyrrolidone, triethylene glycol and water was then led via line 59 through heat and power-exchanger 61 to collection vessel 62. From collection vessel 62 a portion of the mixture was led via line 63 to reconcentrator 64, a still, where the N-methyl pyrrolidone and its contained impurities were distilled from the triethylene glycol. The reconcentrator operated at a temperature range of from 375° F. to 400°F. The distilled N-methyl pyrrolidone and its associated impurities were led via line 66 to its confluence with line 60 from where it was introduced into the lactam regenerator 68. The reconcentrated triethylene glycol at the bottom of reconcentrator 64 were then repressurized and led via line 67 for introduction by spray head 57 into secondary absorption section 52 of column 50.

The major portion of the N-methyl pyrrolidone/triethylene glycol mixture was led via line 60 to the regenerator 68. The regenerator operated at 300°–350°F. 5–8 psig. The impurities, including water, absorbed hydrocarbons, and some acidic impurities from the natural gas were distilled leaving a substantially anhydrous (less than 1–2 percent water) mixture of triethylene glycol and N-methyl pyrrolidone which was led via line 69, through power and heat-exchanger 61 where it was cooled and pressurized, to spray head 55 at the top of primary absorption chamber. Here the mixture was reintroduced into column 50.

It will be seen that once the plant is started up, the N-methyl pyrrolidone introduced via spray 55 will become admixed with a portion of triethylene glycol. The proportion of these materials after continuous operation becomes fairly constant. At the normal feed rates of triethylene glycol from spray 57 and the mixture from spray 55 to yield natural gas having an acceptable dewpoint, an N-methyl pyrrolidone/triethylene glycol ratio of approximately 10 to 1 is achieved. The presence of the triethylene glycol in the N-methyl pyrrolidone does not materially affect its efficiency in the dehydration of the natural gas.

EXAMPLE 4

NATURAL GAS DEHYDRATION

N-cyclohexyl pyrrolidone was substituted for the triethylene glycol of Example 3 and it was noted that a slightly better efficiency of operation was achieved with this alternate solvent for the absorption of the N-methyl pyrrolidone which was used as the primary dehydration agent.

EXAMPLE 5

TETRAETHYLENE GLYCOL

Tetraethylene glycol, when substituted for the triethylene glycol of Example 3, required somewhat more circulation rate for N-methyl pyrrolidone recovery. Otherwise, the high primary absorption efficiency was maintained.

EXAMPLE 6

REMOVAL OF $SO_2$ FROM FLUE GAS

Using $SO_2$ solubility data for N-methyl pyrrolidone, the following calculation showed applications to stack gas clearup. Flue gases issuing at a rate of 26.5 MMscf/hour from an electric power station, burning bituminous coal and generating 250,000 KW, cooled to a temperature of about 100°–120°F., the fly ash removed and the gases introduced at entry portal 13 of a plant similar to that shown in FIG. 1. The flue gases entering absorption column 10 contained approximately 0.2 percent $SO_2$. The flue gases rising through the primary absorption section 11 were contacted by a countercurrent descending stream of N-methyl pyrrolidone and the $SO_2$ was absorbed therefrom. The N-methyl pyrrolidone was introduced into primary absorption section 11 via sprayer 15 at a temperature of about 80°–110°F. and at a rate of 5,000 gallons/minute. The gases leaving primary absorption section 11 were admitted via bubble cap 18 to secondary absorption section 12 where the gases were contacted with tetraethylene glycol introduced at the upper portion of secondary absorption section 12 via sprayer 17 at a rate of 100 to 1,000 gallons/minute. The purpose of using the tetraethylene glycol is for stack gas humidity control to prevent "white plumes" due to moisture condensation. The amount of glycol required depends upon weather conditions as well as the absorption temperature. The gases containing the N-methyl pyrrolidone entrained during their passage through the primary absorption section were stripped of the N-methyl pyrrolidone by being absorbed into the tetraethylene glycol in its downward countercurrent passage through the ascending gas stream in secondary absorption section 12. The gases leaving primary absorption section 11 via bubble cap 18 entrained and vaporized approximately 15,000 lbs./hour of N-methyl pyrrolidone. After passage through the secondary absorption section 12, this was reduced to less than 40 lbs./hour of N-methyl pyrrolidone exiting through exhaust portal 14.

The accumulated N-methyl pyrrolidone at the bottom of absorption section 11 in collection section 16 was purified under conditions similar to those set forth in Example 1. The tetraethylene glycol accumulating at the top of bubble tray 18 was similarly reconcentrated for recirculation and the N-methyl pyrrolidone stripped therefrom was treated for regeneration as set forth in Example 1. The flue gas issuing from exit portal 14 had its sulfur dioxide content decreased by factor of 10.

The same principle above-described applied to $SO_2$-bearing gases at higher pressures.

As compared to the approximately 4.5 tons/hour of $SO_2$ content in the flue gases (as assayed at entry portal 13) entering the purifying apparatus, less than 900 lbs./hour of $SO_2$ are vented through exit portal 14. The extracted $SO_2$ flashed from the N-methyl pyrrolidone in regenerator 22, was collected at line 23 and was compressed and/or reduced chemically in further apparatus not shown. In this manner, approximately 2 tons/hour of elemental sulfur was recovered.

By using this invention, a useful product is economically recovered. The recovery of this large amount of sulfur pays for the operating costs of this operation and covers additionally the capital investment in plant and solvents for this purification procedure.

EXAMPLE 7

SWEETENING OF NATURAL GAS

In a wellhead plant for the sweetening of natural gas utilizing the process scheme shown in FIG. 1, natural gas, at 800 psig at 80°F., saturated with water and containing sour gases in excess of 10 grains/100 scf was introduced into column 10 via portal 13. The designed capacity of the plant was 8–10 MMscf/day of natural gas. The primary absorption section 11 of column 10 was fitted with 20 contacting trays and the N-methyl pyrrolidone was introduced from sprayer 15 onto the uppermost tray at a rate of approximately 50 gallons/minute. The N-methyl pyrrolidone flowed from the upper portions of the primary absorption section 11 to successively lower trays and absorbed the $H_2S$ and other sour components from the gas as well as the water vapor in its passage to the lower collection section 16 at the bottom of primary absorption section 11. The mixture collected in collection section 16, at the bottom of primary absorber section 11, contained N-methyl pyrrolidone, substantially all of the water from the natural gas, and substantially all of the sulfur containing sour components of the natural gas.

The purified natural gas before entering secondary absorption section 12 via bubble tray 18 tested to a dewpoint of about −10°F and the $H_2S$ and other sour components of the natural gas were reduced to much less than the ¼ grain/100 scf. of sulfur which is the maximum for pipeline acceptance. There would be about 6–8 pounds of N-methyl pyrrolidone/MMscf entrained and vaporized in the natural gas leaving primary absorption section 11.

The natural gas, passing through bubble tray 18, entered the secondary absorption section 12 fitted with five contacting trays where it encountered the absorption solvent N-cyclohexyl-2-pyrrolidone flowing downwardly from solvent spray 17. The N-cyclohexyl pyrrolidone was introduced through spray 17 at a rate of 3–8 gallons/minute/MMscf of natural gas.

The natural gas exiting via portal 14 showed a dewpoint of about −20° ± 5°F. and showed about 0.5 lbs. of entrained and vaporized lactams, i.e., N-methyl pyrrolidone and N-cyclohexyl pyrrolidone/MMscf.

The N-cyclohexyl pyrrolidone, together with the absorbed N-methyl pyrrolidone accumulated at bubble cap 18 at the bottom of secondary absorption section 12.

The N-methyl pyrrolidone together with the absorbed sulfur compounds and water from collection station 16 was led via line 27 through heat exchanger power absorber 21 to the N-methyl pyrrolidone regenerator 22. There the sour gases and water were distilled from the N-methyl pyrrolidone by the application of heat in the range of about 300°–350°F. from heating coil 25. The pressure was about 5 to 8 psig. These sour gases and water vapor were vented via line 23 to recovery sections not shown, where the $H_2S$ was recovered and converted to elemental sulfur. The other sulfur-containing gases were similarly converted to elemental sulfur and the small amount of heavy and/or aromatic hydrocarbons, i.e., $C_4$ and heavier, absorbed from the natural gas by the N-methyl pyrrolidone, were separated, condensed and utilized to supply some of the heat for the system or else separated as liquid product. The carbon dioxide and water vapor were vented into the atmosphere.

The mixture of N-cyclohexyl pyrrolidone plus the absorbed N-methyl pyrrolidone which collected at bubble cap 18 was led via line 30 to the solvent reconcentrator 31 wherein the N-methyl pyrrolidone was distilled off and led via line 34 to its confluence with line 27 near the entrance to the N-methyl pyrrolidone. regenerator 22. There the N-methyl pyrrolidone distilled from the solvent was purified and returned with the rest of the N-methyl pyrrolidone to the system via line 26.

The N-cyclohexyl pyrrolidone from solvent reconcentrator 31 was led via line 36 back to the spray head 17 for reintroduction into secondary absorption section 12 of the column 10.

Utilizing the normal procedures for recovering the sulfur from the $H_2S$ at the capacities set forth, it was possible with 100 MMscf/day of 100 gram gas, to recover more than 6.7 tons of sulfur per day in elemental form. The income from the sulfur and the savings from the recovered hydrocarbons used for fuel would help pay for the operation of the equipment and a portion of its capital cost.. The total loss of the lactams, i.e., N-methyl pyrrolidone and N-cyclohexyl pyrrolidone used for the purification of the natural gas and the recovery of the components from the natural gas would be an insignificant factor in the overall cost of operation. For the 8–10 MMscf/day operation, the loss of these materials, including leakage was in the range of less than 10 pounds per day including normal leakage and decomposition.

EXAMPLE 8

A dehydration pilot plant simulating the plant of Example 7 was run utilizing triethyleneglycol as the recovery solvent instead of the N-cyclohexyl pyrrolidone of Example 7 and showed that this solvent system operated almost as efficiently with glycol as the recovery solvent for the N-methyl pyrrolidone as with the N-cyclohexyl pyrrolidone. The effluent, where treating sour natural gas would meet all the sulfur and moisture requirements by properly adjusting the liquid flow rates. Tetraethylene glycol could be used in place of triethylene glycol by increasing the glycol rate slightly.

What is claimed is:

1. A method for the recovery of N-alkyllactams vaporized and/or entrained in a gaseous stream upon treatment therewith comprising:
   a. contacting said treated gaseous stream having vaporized and/or entrained N-alkyllactams therein with a liquid solvent for said N-alkyllactams in a scrubber zone, said liquid solvent having a boiling point higher than that of said vaporized and/or entrained N-alkyllactams, said liquid solvent absorbing and thus recovering said vaporized and/or entrained N-alkyllactams present in said treated gas stream;
   b. withdrawing said liquid solvent having recovered N-alkyllactams absorbed therein from said scrubber zone;
   c. separating said liquid solvent from said absorbed N-alkyllactams in a regeneration zone for recycling of said liquid solvent to said scrubber zone, said N-alkyllactams separated from said liquid solvent being recycled for use in the further treatment of additional quantities of said gaseous stream to be treated; and
   d. withdrawing the treated gaseous stream from said scrubber zone, said stream having substantially all of the vaporized and/or entrained N-alkyllactam content of the treated gaseous stream passed to said scrubber zone removed therefrom, whereby the treatment of the gaseous stream with N-alkyllactams is accomplished and the treated gaseous stream is withdrawn without appreciable loss of said N-alkyllactams, said loss being minimized by the contact of said treated gaseous stream with the liquid solvent in said scrubber zone, the N-alkyllactams and the liquid solvent being efficiently and conveniently regenerated for contact with additional quantities of the gaseous stream being treated.

2. The process of claim 1 wherein the N-alkylated lactam is N-methyl pyrrolidone.

3. The process according to claim 2 wherein the solvent is an N-alkyl or N-cycloalkyl pyrrolidone having a boiling point at least 50°C above that of N-methyl pyrrolidone.

4. The process according to claim 1 wherein contacting the gaseous stream with the liquid solvent is by counter-current flow of the gas and the liquid solvent.

5. The process according to claim 4 wherein the contacting of the counter-current streams takes place in an absorption tower containing bubble plates.

6. The process according to claim 4 wherein the contacting of the gas stream is by spraying of the liquid solvent counter-current to the flow of the gaseous stream containing the entrained N-alkyllactam.

7. The method according to claim 1 wherein the gaseous streams were treated with the N-alkyllactam to remove water vapor therefrom.

8. The process according to claim 1 wherein the gaseous streams are treated with the N-alkyllactam to sweeten them by removal of acidic constituents therefrom.

9. The process according to claim 8 wherein the acidic constituents include sulfur compounds and the gaseous streams are treated to remove the sulfur compounds therefrom.

10. The method according to claim 1 wherein the gas streams are treated to remove sulfur dioxide therefrom.

11. The method according to claim 7 wherein the gaseous streams are treated with the N-alkyllactam to simultaneously remove water vapor and the acidic components therefrom.

12. A method for the recovery of N-alkyllactams vaporized and/or entrained in a gaseous stream upon treatment therewith comprising:
   a. contacting said treated gaseous stream having vaporized and/or entrained N-alkyllactams therein with a liquid solvent for said N-alkyllactams in a scrubber zone, said liquid solvent consisting essentially of a liquid polyethylene glycol having a boiling point higher than that of said vaporized and/or entrained N-alkyllactams, said liquid solvent absorbing and thus recovering said vaporized and/or entrained N-alkyllactams present in said treated gas stream;
   b. withdrawing said liquid solvent having recovered N-alkyllactams absorbed therein from said scrubber zone;
   c. separating said liquid solvent from said absorbed N-alkyllactams in a regeneration zone for recycling of said liquid solvent to said scrubber zone, said N-alkyllactams separated from the liquid solvent being recycled for use in the further treatment of additional quantities of said gaseous stream to be treated; and
   d. withdrawing the treated gaseous stream from said scrubber zone, said stream having substantially all of the vaporized and/or entrained N-alkyllactam content of the treated gaseous stream passed to said scrubber zone removed therefrom, whereby the treatment of the gaseous stream with N-alkyllactams is accomplished and the treated gaseous stream is withdrawn without appreciable loss of said N-alkyllactams, said loss being minimized by the contact of said treated gaseous stream with the liquid solvent in said scrubber zone, the N-alkyllactams and the liquid solvent being effectively and conveniently regenerated for contact with additional quantities of the gaseous stream being treated.

13. The method of claim 12 in which said liquid polyethylene glycol is taken from the group consisting of di-, tri- and tetra ethylene glycol.

14. The method of claim 12 in which said liquid solvent has a boiling point at least 25°C above that of said N-alkyllactams being recovered.

15. The method of claim 13 in which said liquid solvent comprises triethylene glycol.

16. The method of claim 13 in which said liquid solvent comprises tetra ethylene glycol.

17. The method of claim 12 in which said vaporized and/or entrained lactam comprises N-methyl pyrrolidone, the liquid solvent having a boiling point above that of said N-methyl pyrrolidone being taken from the group consisting of di-, tri-, and tetra ethylene glycol and N-cyclohexyl pyrrolidone.

18. The method of claim 17 in which said liquid solvent comprises triethylene glycol.

19. The method of claim 17 in which said liquid solvent comprises N-cyclohexyl pyrrolidone.

20. The method of claim 17 in which said liquid solvent has a boiling point at least 25°C above that of said N-alkyllactams being recovered.

* * * * *